United States Patent [19]

Riley et al.

[11] Patent Number: 4,642,861
[45] Date of Patent: Feb. 17, 1987

[54] MACHINE TOOL CONSTRUCTION

[75] Inventors: Kenneth E. Riley, Sterling Heights; Eugene Skowron, Mt. Clemens, both of Mich.

[73] Assignee: Saginaw Machine Systems, Inc., Troy, Mich.

[21] Appl. No.: 785,603

[22] Filed: Oct. 8, 1985

Related U.S. Application Data

[63] Continuation of Ser. No. 531,044, Sep. 12, 1983, abandoned.

[51] Int. Cl.⁴ .......................... B23P 23/00; B23B 3/20
[52] U.S. Cl. ..................... 29/38 A; 82/2 D; 384/7; 408/137
[58] Field of Search ............... 29/38 A, 1 A; 82/2 D; 409/80, 173, 191, 231–233; 123/90.5; 408/3, 45, 137, 129; 74/89.15; 308/3 R, 3 A

[56] References Cited

U.S. PATENT DOCUMENTS

| | | | |
|---|---|---|---|
| 1,396,165 | 11/1921 | Cory | 409/219 |
| 2,920,896 | 1/1960 | Buck | 279/123 |
| 3,144,736 | 8/1964 | Rusk et al. | 409/232 X |
| 3,203,316 | 8/1965 | Cashman et al. | 409/107 |
| 3,389,625 | 6/1968 | Wagner | 82/2 D |
| 4,159,660 | 7/1979 | Buckley et al. | 82/2 D X |
| 4,351,096 | 9/1982 | Depweg et al. | 29/38 A |

FOREIGN PATENT DOCUMENTS 77420  5/1983  Japan .................................. 408/137

Primary Examiner—Gil Weidenfeld
Assistant Examiner—Steven C. Bishop
Attorney, Agent, or Firm—Learman & McCulloch

[57] ABSTRACT

A machine tool has a workholder and an axially aligned toolholder in juxtaposed relation, mounted for relative rotation. A first slide supported for longitudinal reciprocating movement along a "y" axis, supports a cross slide on which a toolholder is mounted for reciprocating crosswise movement to the first slide along an "x" axis. Bell crank motion transmission mechanism on the first slide is interposed between a push bar connected between an NC controlled rotary servo motor and the cross slide, and another NC controlled rotary servo motor is mounted to operate the first slide. Rotary to linear motion translation mechanism couples one servo motor to the first slide and another servo motor to the push bar. The push bar has a longitudinally extending flat face portion thereon and a member extends parallel with the flat face portion crosswisely to the longitudinal extent thereof to ride along the flat face portion. Mechanism is provided for releasably anchoring the member in position relative to the push bar flat face to positively preclude rotation of the push bar while permitting its linear longitudinal movement parallel to the "y" axis.

6 Claims, 7 Drawing Figures

MACHINE TOOL CONSTRUCTION

This is a continuation of co-pending application Ser. No. 531,044 filed on Sept. 12, 1983, now abandoned.

BACKGROUND OF THE INVENTION

The present invention relates to improvements in machine tools of the type adapted to automatically perform operations such as boring, milling, facing, turning, grinding or the like, on workpieces, on a production run basis. A machine of the general character with which the invention may be employed is disclosed in the present assignee's U.S. Pat. No. 3,203,316, issued Aug. 31, 1965. Machine tools of this character are required to perform machining operations with ever-increasing precision.

In the patent mentioned, the movement of the slides and tappets is controlled by cams which permit a compound movement of each tool in response to the contours of a cam for the vertical slides, and a separate cam for the horizontal slides which they carry.

To provide even greater versatility and precision, the present machines have been altered to replace the cams with computer numerically controlled (CNC) servo motors and we have determined that this necessitates new structure in the motion transmission system to achieve the accuracy which is required, while still retaining the high production which is necessary. Because, with such structures, the drive is now a rotary motion, which must be positively translated without any lost motion, or rotary looseness, to straight line motion of a tappet operating a bell crank controlled cross slide, it is necessary to avoid the introduction of any linear error due to rotary looseness or radial thrust.

One of the prime objects of the present invention is to provide a mechanism which permits conversion of the control of the x and y axis slides from cam and cam follower control to off-axis, bi-directional NC control, without any loss of precision and introduction of linear error.

Still another object of the invention is to design a construction providing straight line precision movement with a "running fit".

Still a further object of the invention is to provide gravity counterbalancing mechanisms for the slide mechanism which reduces the forces which otherwise would severely stress the motion transmission mechanism.

SUMMARY OF THE INVENTION

Briefly, the mechanism contemplates a base with a support frame mounted on the base, and means for mounting a work holder, and a generally axially aligned tool holder, in juxtaposed relation on the frame and base. NC controlled, rotary, servo motors, for a carrier slide, are mounted on the frame for reciprocating movement along a y axis, and an NC controlled rotary servo motor is provided for actuating a cross slide which is mounted on the first slide for reciprocating perpendicular movement relative to the first slide along an x axis, there being means on the cross slide for supporting one of the holders.

A motion transmission device is provided for transmitting movement to the associated cross slide, and precision mechanism is provided for positively translating rotary motion of the servo motor to linear motion of the cross slide. The construction involved permits preservation of the bell crank transmission and tappet elements involved in the machines such as disclosed in the aforementioned patent, such that the conversion of existing machines is as simple, economical and reliable as possible, with no sacrifice of precision, and with the greater versatility which the use of CNC control provides. The retrofitting of machines incorporating such motion transmission devices can, in fact, be accomplished in the field.

Other objects and advantages of the invention will become apparent by reference to the following specification and to the drawings.

IN THE DRAWINGS

Figure 1:
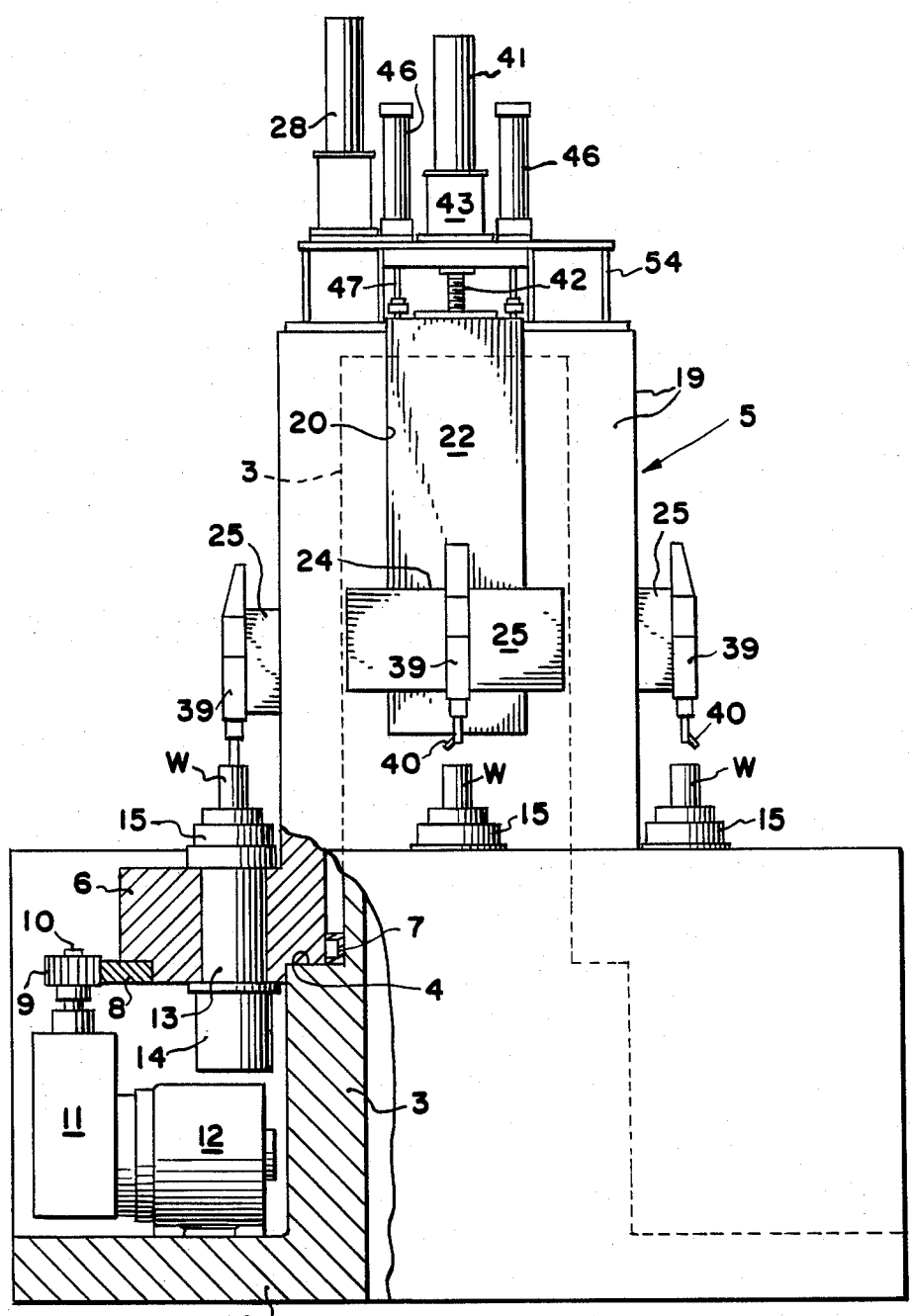
FIG. 1 is a front elevational view, partly in section, of a machine tool which incorporates the present invention.

Referring now more particularly to FIG. 1, for an understanding of an environment in which the invention may be incorporated, a base 2 is provided on which is supported a centrally upstanding tubular column 3, provided with an external bearing surface 4 on which a turret 5 is supported. The turret 5 includes a table 6 mounted for rotation about the axis of column 3, and a plurality of bearings 7 are provided as shown. Any suitable mechanism may be provided for achieving relative rotation between the base 2 and turret 5, and, in FIG. 1, a ring gear 8 is shown as fixed to the table 6. Gear 8 has its teeth in mesh with the teeth of a drive pinion gear 9 which may be fixed to the output shaft 10 of a suitable speed reduction unit 11, driven by electric motor 12.

Provided on table 6 are a plurality of spindle housings 13, each of which may include a rotatable spindle driven by its own motor 14, and incorporating a workholder or chuck 15 for releasably clamping a workpiece W. The spindles and chucks illustrated may be those more particularly described in U.S. Pat. No. 3,149,852, issued Sept. 22, 1964.

For purposes of convenience, the turret 5 is shown as a four-sided member having four supporting faces generally designated 19. Each of the four sides, adjacent the upper end thereof, is vertically grooved as at 20 to provide a slideway 21 for a vertically reciprocable slide member 22, which is slidable on rollers interposed between the slideway 21 and the slides 22, in the manner disclosed in U.S. Pat. No. 3,203,316. The construction of the slideways, and their associated parts may correspond to the construction disclosed in U.S. Pat. No. 3,149,852, issued Sept. 22, 1964.

Figure 1A:
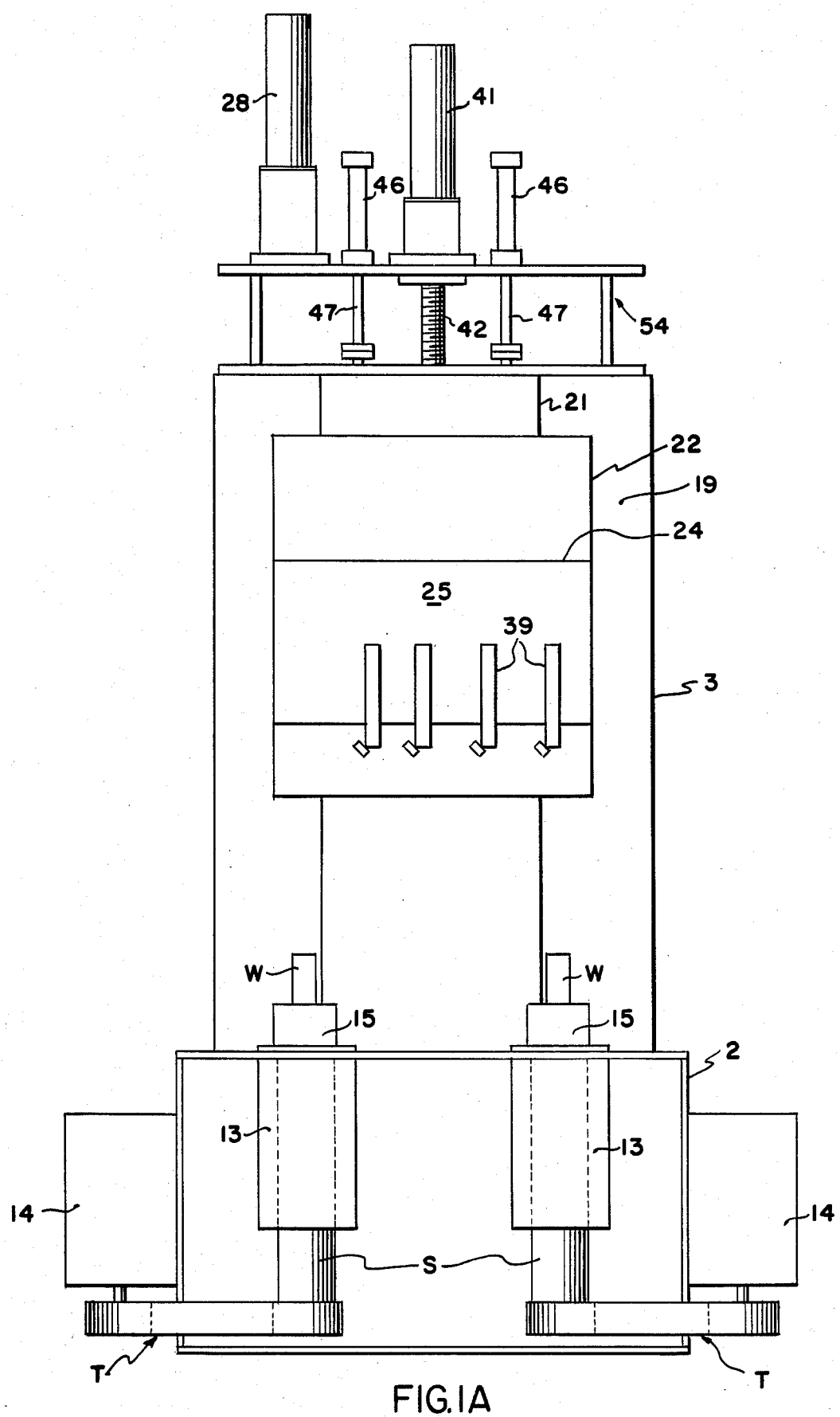
FIG. 1A is a similar view of a similar machine tool in which, however, the tool holders are provided on only one side of a fixed frame.

Alternatively, the frame 3 may not be rotatable and may simply be fixed as shown in FIG. 1A where identical numbers have been used to identify the same or similar parts having the same function. The machine may have one or more chucks 15 and tool holders 39 mounted on only one side face 19. Here spindles S are driven by motors 14 through a belt and sheave or chain and sprocket transmission system T.

Figure 2:
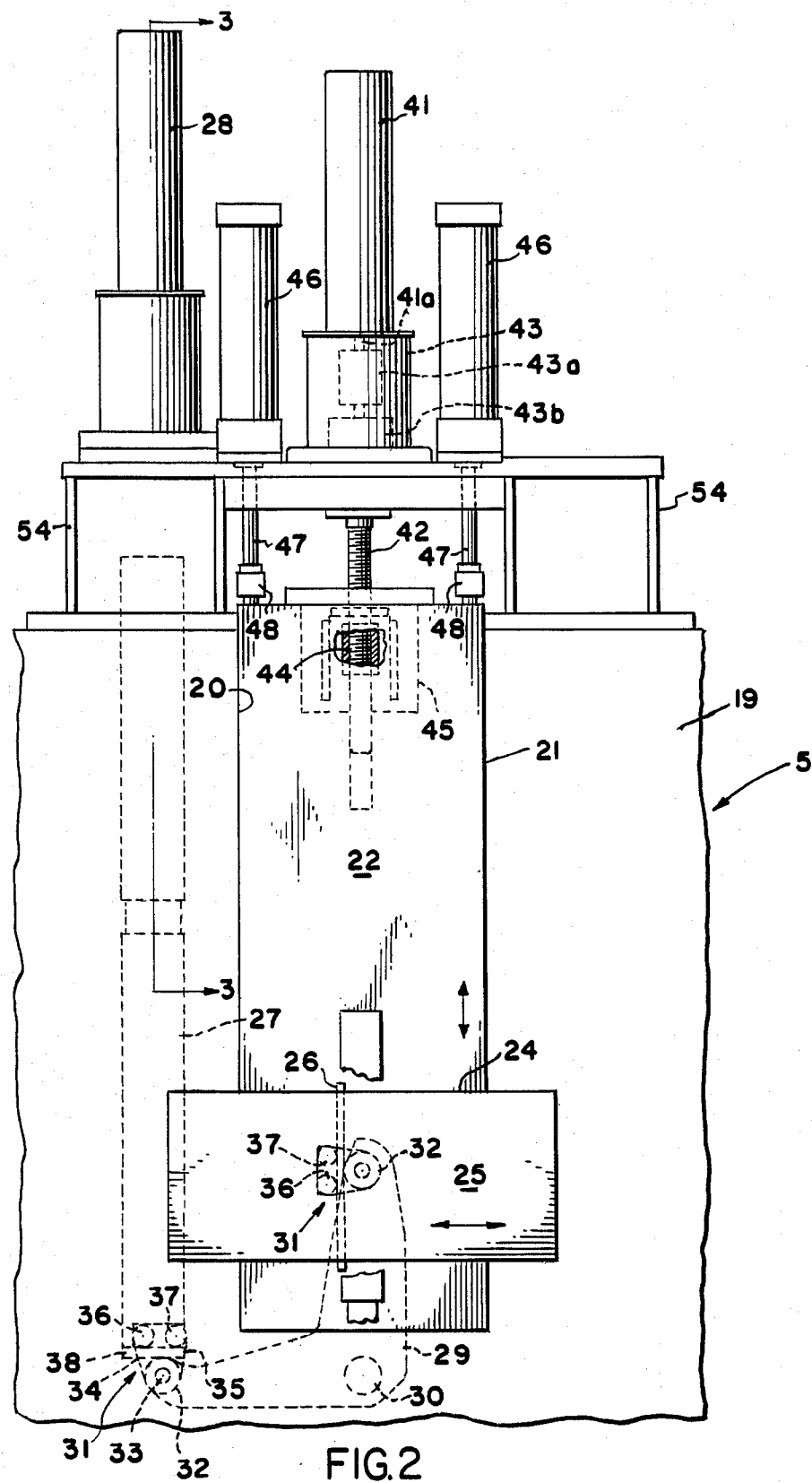
FIG. 2 is an enlarged elevational view of the upper portion of either machine tool.

Adjacent its lower end, each reciprocable slide 22 is grooved to provide a slideway 24 for a horizontally reciprocable cross slide 25. Each slide 25 carries an operating flange 26 (FIG. 2), having parallel planar surfaces parallel to slideway 21 and the slide side surfaces, the flange 26 projecting through a suitable opening formed in slide 22, so as to be capable of engagement with an operating member to be described.

The operating motion which is transmitted to the flange 26 of each cross slide 25 is transmitted from a tappet 27, reciprocably mounted by the frame 5 at one side of the associated slide 22. Each tappet 27 is, however, in the present instance not being driven by a cam as previously, but by a suitable NC controlled servo motor 28, in a manner to be presently described. The mechanism for connecting each tappet 27 and flange 26, as previously, includes a bell crank 29, pivoted on a shaft 30 carried on each face 19. One end of the bell crank 29 extends toward tappet 27 and carries at its end a clamp device of the type referred to in U.S. Pat. No. 3,178,789, issued Apr. 20, 1965. The clamp apparatus 31 may take the form of a roller 32, journaled on a shaft 33 carried by bell crank 29. Also journaled on shaft 33 is a pair of rockable arms 34 and 35, constantly urged to rotate away from one another by spring means (not shown) interposed therebetween. Each of the arms 34 and 35 journals a roller 36 and 37, respectively, and the lower end of each tappet 27 is provided with a flat plate 38, having parallel opposed surfaces which are clamped between the roller 32 and rollers 36 and 37.

Each bell crank 29 also includes a second free end with a similar clamp apparatus 31 clamping to flange 26 via rollers 36, 37 and 32 as previously. With this construction, positive clamping is assured so that rocking movement of the bell crank 29 in either direction will provide direct movement of the cross slide 25 in one direction or the other, without the imposition of any torsional stresses on tappet 27 or slide 25 Each of the slides 25 supports a tool holder 39 which carries a tool 40, such as a boring tool, adapted to engage and machine a bore in the associated workpiece W.

Provided to reciprocate slide 22 on each face 19 under the control of a suitable, commercial, numerically controlled servo motor, such as shown at 41, is a ball screw shaft 42 projecting from a housing 43, in which is a coupling 43a for connecting the shaft 42 to the output shaft 41a of the motor 41 and a bearing 43b for the shank of screw 42. The screw 42 is operatively engaged with a ball nut 44, carried by slide 22 in a recirculating type, ball nut housing 45. Provided to substantially counterbalance the weight of slide 22 and its associated cross slide 25 on each side of the machine, are counterbalancing air cylinders 46, having piston rods 47 which are coupled as at 48 to the upper end of direct-coupled slide 22. Sufficient air pressure is maintained in cylinders 46 beneath the pistons of piston rods 47, such that there is virtually no weight imposed on the ball nuts 44 and the recirculating balls which are utilized therein.

Figure 3:
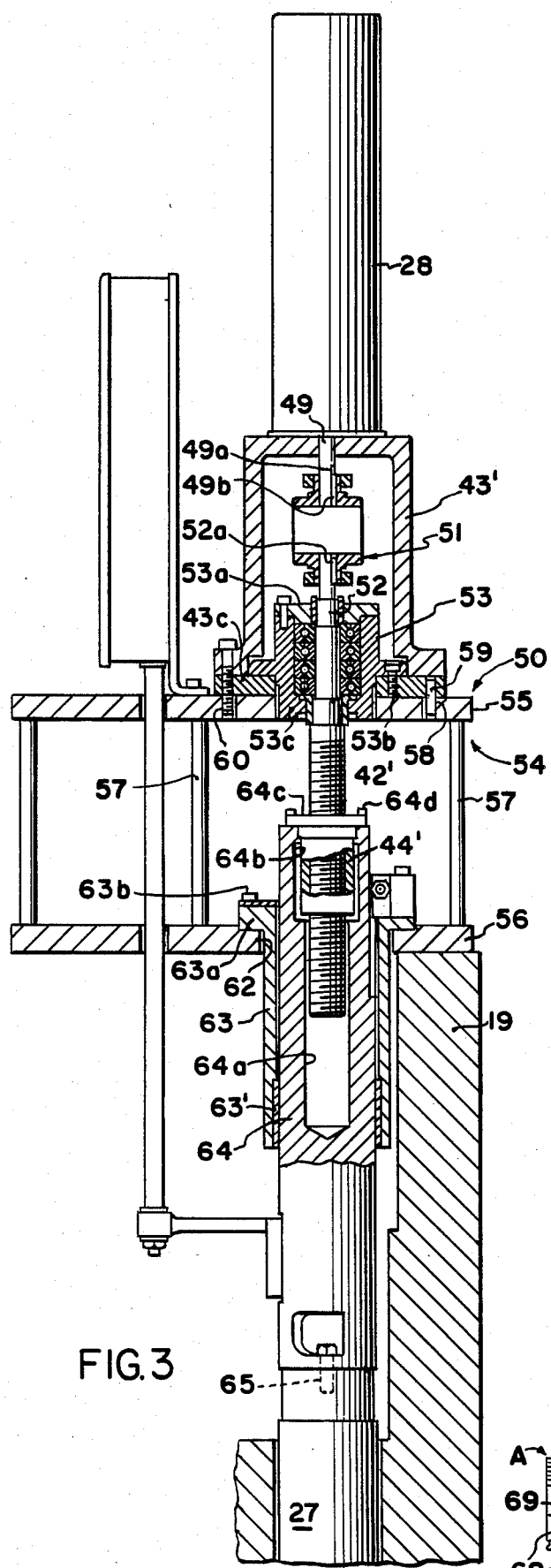
FIG. 3 is a partly sectional, vertical sectional view taken on the line 3—3 of FIG. 2.

Each motor 28 (see FIG. 3) has an output shaft 49, connected with a similar ball screw 42', via a coupling device 51, and it will be seen that screw 42' similarly has its connecting shank portion 52 journaled within a bearing device 53, provided within a similar housing 43'. Each motor 28 and 41, and each of the cylinders 46, is supported on the upper end of frame 5 by a weldment structure 54 which includes an upper plate 55, and a lower plate 56, connected by vertical brace rods 57. Openings 58 in top plate 55 (see FIG. 3) receive dowels 59 for locating the lower housing plate 43a for each housing 43 and 43', and similarly receives the housing securing cap screws 60. A keyway 49a, provided in each motor output shaft 49, receives a key 49b provided on each coupling 51 and a keyway 52a, provided in each shaft 52, receives a key which is carried by each coupling 43a and 51. The bearing array 53 is retained by a bearing plate 53a and cap screws 53b are provided to anchor the bearing housing 53c in position.

Provided in each lower plate 56 of the weldment 54 is an opening 62 to receive a guide sleeve 63 for a push rod 64 which is bolted to the upper end of each tappet 27 as at 65 and incorporates a slide bushing 63'. Each sleeve 63 is supported on the weldment frame 56 by a flange 63a bolted in position as at 63b. As FIG. 3 particularly indicates, the upper end of each push rod 64 has a bore 64a, within which the lower end of associated screw 42' may be received. An enlarged bore 64b at the upper end of bore 64a is provided for the ball screw nut 44' which has a cap plate 64c anchored to the push bar 64 by bolts 64d and it is to be understood that nut 44' is positively prevented from moving relative to the push bar.

Figure 4:
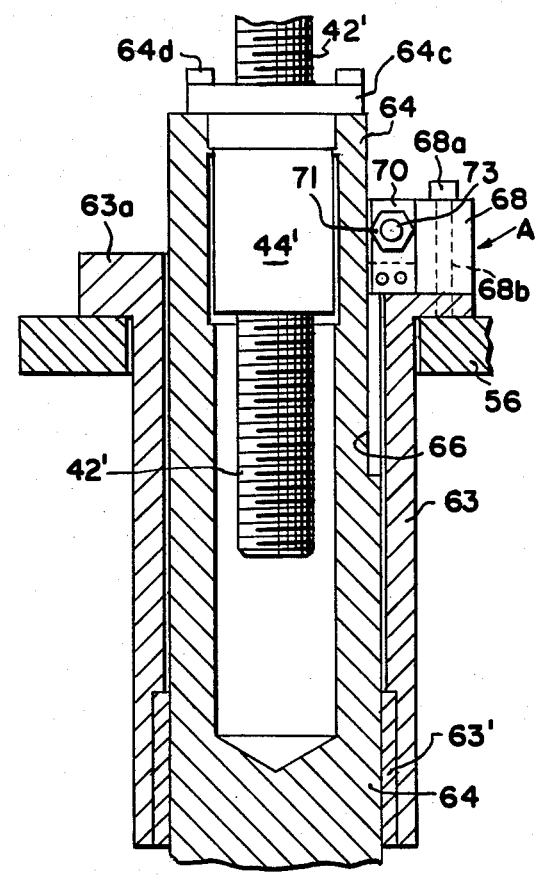
FIG. 4 is a considerably enlarged fragmentary view of a portion of the mechanism disclosed in FIG. 3, illustrating the manner in which a running fit is achieved between the parts to avoid loss of precision.
Figure 5:
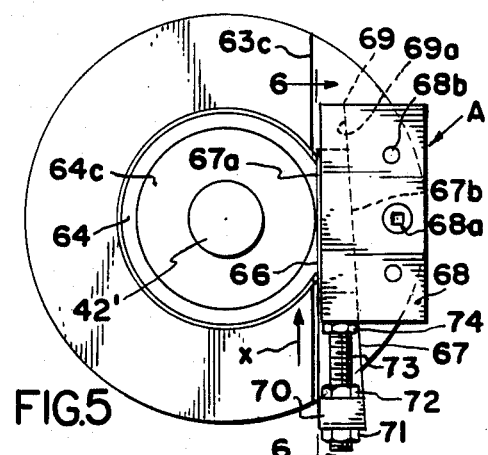
FIG. 5 is a top plan view of the mechanism disclosed in FIG. 4.
Figure 6:
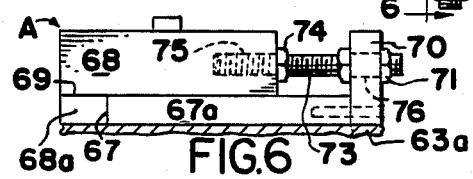
FIG. 6 is a side elevational view of the motion restraining bar assembly illustrated in FIGS. 4 and 5, taken on the line 6—6 of FIG. 5.

It is extremely important to avoid the imposition of any torsional forces on tappet 27 which would result in errors in the transmission of movement to cross slide 25 via bell crank 29. As FIG. 4 particularly indicates, a vertical surface 66 on the upper end of push rod 64 is ground with a flat surface so as to be absolutely flat and vertically in line with the axis of shaft 42', surface 66 extending a sufficient distance on push bar 64 to provide for relative vertical travel of the push bar surface 66 with relation to a normally stationary wedge-shaped bar 67 (FIG. 5). Flange 63a is cut away or recessed as at 63c adjacent surface 66 to receive a motion restraining bar supporting and adjusting assembly A which includes support block 68 bolted as at 68a to flange 63a. Block 68 may be provided with suitable locating dowels 68b. Bar 67 has a flat surface 67a, extending laterally in FIG. 4 exactly parallel to surface 66 and an opposite flat surface 67b tapering to provide a diverging effect with surfaces 66 and 67a in the direction x in FIG. 5. Rotation restraining bar 67 is accommodated in the slot or recess 69 provided in the lower surface of guide block 68 and has a side surface 69a complementing surface 69a tapering at the same angle. At its front end, bar 67 mounts a tang 70, as by bolts 71, which is adjustably secured at its front end by locking nuts 72 to a threaded stud 73 which is locked by a nut 74 in a threaded bore 75 in block 68. The stud 73 passes through a non-threaded bore 76 in tang 70. The bar 67 is in position to provide a "running fit" in the sense it is not taper-locked. A push-pull adjustment is provided by screw 73 to adjust bar 67 longitudinally to take up wear.

With the member 67 providing a running fit, even though twisting or torsional forces are applied to the nut 44', such forces are positively prevented from being transmitted to the push bar 64.

THE OPERATION

In operation, the compound movement of a tool 40 is effected by the movement of both slides 22 and 25. Numerically controlled servo motor 41, via the rotation of screw 42 which rotates but is fixed against axial movement, converts the rotation of shaft 42 to axial movement of nut 44. At the same time, the similarly numerically controlled rotation of each screw shaft 42', driven by servo-motor 28, for controlling the movement of the associated cross slide 25, is converted to vertical reciprocation of the push bar 64 via the nut 44. The bar 67 positively prevents the imposition of any twisting stresses to push bar 64 and tappet 27 which would distort the transmission of movement via bell crank 29 to cross slide 25.

Servo motors 41 and 28 are numerically controlled by a suitable controller having a tape reader and other control elements such as are indicated to be available in U.S. Pat. No. 4,214,309. Motors 41 and 28 can, for instance, be controlled via the commercially available, Allen Bradley Controller 8200. Because there is no lost motion error due to screw shaft rotation transmission to the push bars, the controller is not registering motion which never takes place, and its digital readout display accurately portrays the x and y distances from start position of the slides 22 and 25.

While one embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

We claim:

1. In a machine tool having a base; a support frame mounted on said base; means for mounting a series of work holders and a series of generally axially aligned tool holders in juxtaposed relation on said frame and base; said latter means including a series of first slides mounted on said frame for longitudinal reciprocating movement along a "y" axis; a cross slide mounted on each first slide for reciprocating perpendicular movement to said first slide along an "x" axis; means on said cross slides for supporting one of said series of holders; a tappet for each cross slide mounted for longitudinal movement on said frame in a reciprocable path parallel to the path of movement of said first slides; and a series of bell crank motion transmission mechanisms on each first slide interposed for transmitting movement of each tappet to a cross slide; the improvement comprising:
   a. NC controlled rotary servo motors for said first slides supported on said frame;
   b. NC controlled rotary servo motors for driving said cross slides supported by said frame;
   c. ball screw and nut assemblies coupling certain of said rotary motors to said first slides;
   d. longitudinally extending push bars mounted for movement on said frame along vertical axes parallel to said "y" axis;
   e. means fixedly coupling said tappets to said push bars;
   f. ball screw and nut assemblies coupling certain of said rotary motors to said push bars;
   g. said push bars having longitudinally extending sides with vertically extending flat face portions thereon extending parallel to said push bar axes; and
   h. rotation restraining means fixed to said frame adjacent each push bar flat face portion and consisting of a bar assembly comprising: an elongate wedge-shaped bar extending off-axis lengthwisely parallel with each flat face portion crosswisely to the vertical extent of the flat face portion, the bar having a first vertically extending flat face parallel to and adjacent said flat face of the push bar portion and an opposite flat side face vertically parallel to said first flat face and axis inclined in a crosswise direction with relation to said push bar axis and push bar flat face portion and said first flat face, the first identified flat face on said wedge-shaped bar being spaced from said push bar flat portion by only an operating clearance; slideway means fixed to said frame and having a vertically parallel flat face inclined to match and interact with said inclined side face to vary the operating clearance between said flat face portion and bar, with movement of said wedge-shaped bar relative to said slideway means; and means for releasably anchoring said wedge-shaped bar in position relative to said slideway means flat face portion to positively preclude rotation of said push bar while permitting its linear longitudinal movement parallel to the "y" axis.

2. The improved machine tool of claim 1 wherein said slideway means includes a base secured in fixed position on said frame having a crosswisely extending way receiving said wedge-shaped bar; a tang on the rear end of the wedge-shaped bar projecting laterally therefrom; and releasable lock means connecting the tang and base for locking the wedge-shaped bar in a particular position in said way, while relesable to permit movement of said wedge-shaped bar crosswisely to the push bar to a position in which it can be relocked.

3. The improved machine tool of claim 2 wherein a bushing is supported on said frame to support each push bar, and said bushing has a top flange which is crosswisely recessed to accommodate said assembly; said base being located and secured in position in said recessed portion, and terminating short of the protrusions of said wedge-shaped bar to the flat face portion on said push bar.

4. The improved machine tool of claim 2 wherein said releaseable lock means includes a threaded stud on said base passing through said tang; and nut means on said stud on both sides of said tang which can be manipulated to move the tang and wedge-shaped bar forwardly or rearwardly thereon.

5. The improved invention of claim 4 wherein air cylinder means connects between said frame and first slide to counterbalance the weight of said first slide.

6. In a machine tool having a base; a support frame mounted on said base; means for mounting a work holder and a generally axially aligned tool holder in juxtaposed relation on said frame and base; said latter means including a first slide mounted on said frame for longitudinal reciprocating movement along a "y" axis; a cross slide mounted on said first slide for reciprocating perpendicular movement to said first slide along an "x" axis; means on said cross slide for supporting one of said holders; a push bar for said cross slide mounted for longitudinal vertical movement on said frame along a longitudinal axis in a reciprocable path parallel to the path of movement of said first slide; and a bell crank motion transmission mechanism on said first slide interposed for transmitting movement of said push bar to said cross slide; the improvement comprising:
   a. a first NC controlled rotary servo motor for said first slide supported on said frame;
   b. second NC controlled rotary servo motor for driving said cross slide supported by said frame;

c. rotary to linear motion translation mechanism coupling said first rotary motor to said first slide;
d. rotary to linear motion translation mechanism coupling said second rotary motor to said push bar;
e. said push bar having a vertically extending side with a longitudinally axially extending flat face portion thereon;
f. rotation restraining means fixed to said frame adjacent each push bar flat face portion consisting of a bar assembly comprising: an elongate wedge-shaped bar, extending lengthwisely parallel with each flat face portion crosswisely to the longitudinal axial extent of the flat face portion, the bar having a first vertically extending flat face parallel to and adjacent said flat face of the push bar portion and an opposite flat side face vertically parallel to said first flat face and axis inclined in a crosswise direction with relation to said push bar axis and push bar flat face portion, and said first flat face, the first identified flat face on said wedge-shaped bar being spaced from said push bar flat face portion only by an operating clearance; slideway means fixed to said frame and having a vertically parallel flat face inclined to match and interact with said inclined side face to vary the operating clearance between said flat face portion and bar, with movement of said wedge-shaped bar relative to said slideway means; and means for releasably anchoring said wedge-shaped bar in position relative to said slideway means flat face portion to positively preclude rotation of said push bar while permitting its linear longitudinal movement parallel to the "y" axis.

* * * * *